United States Patent [19]

Hashimoto et al.

[11] 4,443,856
[45] Apr. 17, 1984

[54] ELECTRONIC TRANSLATOR FOR MODIFYING AND SPEAKING OUT SENTENCE

[75] Inventors: Shintaro Hashimoto, Ikoma; Masafumi Morimoto, Yamatokoriyama; Tosaku Nakanishi, Nara; Hideo Yoshida, Kashihara; Shigenobu Yanagiuchi, Tenri, all of Japan

[73] Assignee: Sharp Kabushiki Kaisha, Osaka, Japan

[21] Appl. No.: 282,238

[22] Filed: Jul. 10, 1981

[30] Foreign Application Priority Data

Jul. 18, 1980 [JP] Japan .................................. 55-99458

[51] Int. Cl.³ .............................................. G10L 1/00
[52] U.S. Cl. ................................... 364/513.5; 381/51
[58] Field of Search ................ 179/1.5 M, 1.5 G, 1 B; 364/513, 410, 419, 513.5; 434/167; 381/51, 52

[56] References Cited

U.S. PATENT DOCUMENTS 3,928,722 12/1975 Nakata et al. .................. 179/1.5 M

FOREIGN PATENT DOCUMENTS 2014765 11/1978 United Kingdom .

OTHER PUBLICATIONS

Buckholz, "Computer Controlled Audio Output", IBM Tech. Bull. Oct. 1960, p. 60.

*Primary Examiner*—E. S. Matt Kemeny
*Attorney, Agent, or Firm*—Birch, Stewart, Kolasch & Birch

[57] ABSTRACT

An electronic translator of a desired sentence in a first language to a desired sentence in a second language includes exemplary sentences and selectable words in both languages to simplify translation, and a voice synthesizer to speak the translated desired sentence.

6 Claims, 26 Drawing Figures

| L\H | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A | B | C | D | E | F | G | H | I | J | K | L | M | N | O | P |
| 1 | Q | R | S | T | U | V | W | X | Y | Z | | | | | | |
| 2 | AN | BA | BE | BO | BU | CA | CH | CK | CL | COM | CON | CO | DA | DE | DI | DO |
| 3 | EN | EX | FA | FE | FI | FO | FUL | GE | GH | GO | HA | HE | HI | HO | IN | KE |
| 4 | KI | LA | LE | LI | LO | LY | MA | ME | MI | MO | MU | ND | NE | NG | NI | NO |
| 5 | NT | ON | PA | PE | PI | PO | PU | RA | RE | RI | RO | SA | SE | SH | SI | SO |
| 6 | ST | SU | TA | TE | TH | TI | TO | TU | TY | UN | VE | VI | WA | WE | WI | WO |
| 7 | 0 | 1 | 2 | 3 | 4 | 5 | 6 | 7 | 8 | 9 | $ | C0 | C1 | C2 | C3 | C4 |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | C5 |

FIG. 6

| 8 | 7 | 6 | 5 | 4 | 3 | 2 | 1 | BIT |
|---|---|---|---|---|---|---|---|---|
| 1 | | | | | A | | | |
| 1 | | | | | N | | | |
| 0 | | | | | AN | | | |
| 1 | | | | | B | | | |
| 1 | | | | | A | | | |
| 0 | | | | | BA | | | |
| 1 | | | | | B | | | |
| 1 | | | | | E | | | |
| 0 | | | | | BE | | | |
| 1 | | | | | B | | | |
| 1 | | | | | O | | | |
| 0 | | | | | BO | | | |
| 1 | | | | | B | | | |
| 1 | | | | | U | | | |
| 0 | | | | | BU | | | |
| 1 | | | | | C | | | |
| 1 | | | | | A | | | |
| 0 | | | | | CA | | | |
| 1 | | | | | C | | | |
| 1 | | | | | H | | | |
| 0 | | | | | CH | | | |
| 1 | | | | | C | | | |
| 1 | | | | | K | | | |
| 0 | | | | | CK | | | |
| 1 | | | | | C | | | |
| 1 | | | | | L | | | |
| 0 | | | | | CL | | | |
| 1 | | | | | C | | | |
| 1 | | | | | O | | | |
| 1 | | | | | M | | | |
| 0 | | | | | COM | | | |
| 1 | | | | | C | | | |
| 1 | | | | | O | | | |
| 1 | | | | | N | | | |
| 0 | | | | | CON | | | |
| 1 | | | | | C | | | |

| | |
|---|---|
| 1 | T |
| 1 | H |
| 0 | TH |
| 1 | T |
| 1 | I |
| 0 | TI |
| 1 | T |
| 1 | O |
| 0 | TO |
| 1 | T |
| 1 | U |
| 0 | TU |
| 1 | T |
| 1 | Y |
| 0 | TY |
| 1 | U |
| 1 | N |
| 0 | UN |
| 1 | V |
| 1 | E |
| 0 | VE |
| 1 | V |
| 1 | I |
| 0 | VI |
| 1 | W |
| 1 | A |
| 0 | WA |
| 1 | W |
| 1 | E |
| 0 | WE |
| 1 | W |
| 1 | I |
| 0 | WI |
| 1 | W |
| 1 | O |
| 0 | WO |
| 1 | 1 1 1 1 1 1 1 ← $c_6$ |

FIG. 7

| | | |
|---|---|---|
| 1 | W | |
| 0 | H | |
| 0 | EN | |
| 1 | SH | |
| 0 | O | WHEN SHOULD |
| 0 | U | I (CHECK IN)? |
| 0 | L | |
| 0 | D | |
| 1 | I | |
| 1 | 1 1 1 1 0 1 0 | ← $C_{11}$ |
| 0 | CH | |
| 0 | E | |
| 0 | CK | |
| 1 | 1 1 1 1 0 1 0 | ← $C_{11}$ |
| 0 | IN | |
| 1 | 1 1 1 1 1 0 0 | ← $C_8$ |

FIG. 8(b)

| | | |
|---|---|---|
| 1 | 1 1 1 1 0 1 1 | ← $C_{12}$ |
| 0 | ト | |
| 0 | ウ | |
| 0 | キョ | |
| 0 | ウ | |
| 1 | ユ | (トウキョウ)ユキノ |
| 0 | キ | キップ ガ |
| 0 | ノ | (2)マイ |
| 1 | キ | ホシイ. |
| 0 | ッ | |
| 0 | プ | |
| 1 | ガ | |
| 1 | 1 1 1 1 0 1 0 | ← $C_{11}$ |
| 0 | 2 | |
| 1 | マ | |
| 0 | イ | |
| 1 | ホ | |
| 0 | シ | |
| 0 | イ | |
| 1 | 1 1 1 1 1 1 0 | ← $C_7$ |

FIG. 8(c)

| 15 | WORD STARTING ADDRESS |
|---|---|
| 21 | ------ |
| 90 | ------ |
| 96 | ------ |
| 150 | ------ |
| 162 | ------ |
| 171 | ------ |

FIG.10 (a)

| 1 | SENTENCE STARTING ADDRESS |
|---|---|
| 2 | ------ |
| 4 | ------ |
| 5 | ------ |
| 7 | ------ |
| 9 | ------ |
| 10 | ------ |

FIG.10 (b)

| LETTER |
|---|
| LETTER STARTING ADDRESS |
| |
| |
| |
| |

FIG.10 (c)

| 1 | 2 | 3 | 4 | 5 | 6 | 7 | 8 |
|---|---|---|---|---|---|---|---|
| 9 | 10 | 11 | 12 | | | | |
| | | | | | | | |
| | | | | | | | |

FIG.10 (d)

ELECTRONIC TRANSLATOR FOR MODIFYING AND SPEAKING OUT SENTENCE

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic devices called an electronic translator has been available on the market. The electronic translator differ from conventional electronic devices in that the former is of a unique structure which provides for efficient and rapid retrieval of word information stored in a memory.

Some electronic translators can speak out each time the operator enter figures or signs. As for such translators, it is desired to minimize the memory size to the extent possible, the memory containing a great number of various kinds of verbal information for words and/or sentences. The reason is the verbal information occupies a large number of bits in storage while a large number of different words or sentences are desirably stored in a memory having a limited capacity.

SUMMARY OF THE INVENTION

Accordingly, it is an object of the present invention to provide an improved electronic translator having the capability of modifying the syntax of some stored sentences and of speaking out a modified sentence.

It is another object of the present invention to provide an improved electronic translator having the capability of audibly spelling some words or sentences containing no verbal information stored in memory.

Briefly described, in accordance with the present invention, an electronic translator has the special capability of replacing an old word or words in a sentence with a new word or words to make a new sentence. The translator comprises a voice memory for memorizing verbal information of the new words or words and the old sentence, and a voice synthesizer for providing voice synthesization of the new sentence, word by word.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 6 shows a table representing letters, compression codes, and control codes used in the word data region WC of FIG. 5;

FIG. 7 shows a detailed format of a compression table in the format of FIG. 4(a);

FIGS. 8(a) through 8(d) show detailed formats of a sentence data region SA in the format of FIG. 4(A);

FIG. 10 shows a detailed format of the verbal ROM as indicated in FIG. 9;

DESCRIPTION OF THE INVENTION

First, any language can be applied to the electronic translator of the present invention. An input word is spelled in a specific language to obtain an equivalent word, or a translated word spelled in a different language corresponding thereto. The languages can be freely selected.

Figure 1:
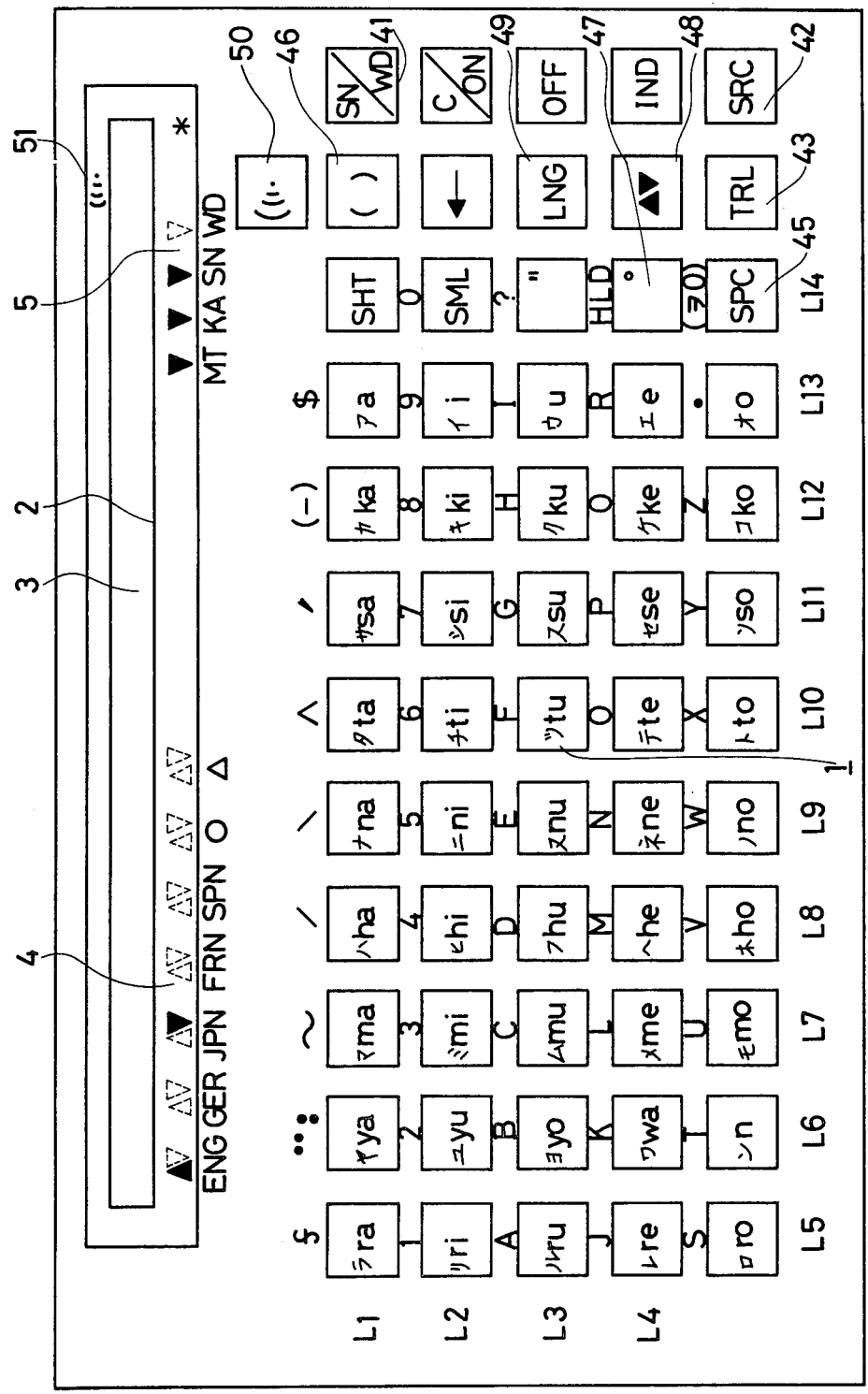
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, and a functional keyboard, an indicator 2 including a character indicator 3, a kind of tongue indicator 4 and a symbol indicator 5.

The character indicator 3 shows characters processed by this translator. The kind of tongue indicator 4 shows symbols used for representing the kind of the mother tongue and the foreign tongue processed by the translator. The symbole indicator 5 shows symbols used for indicating operating conditions in the translator.

Figure 2:
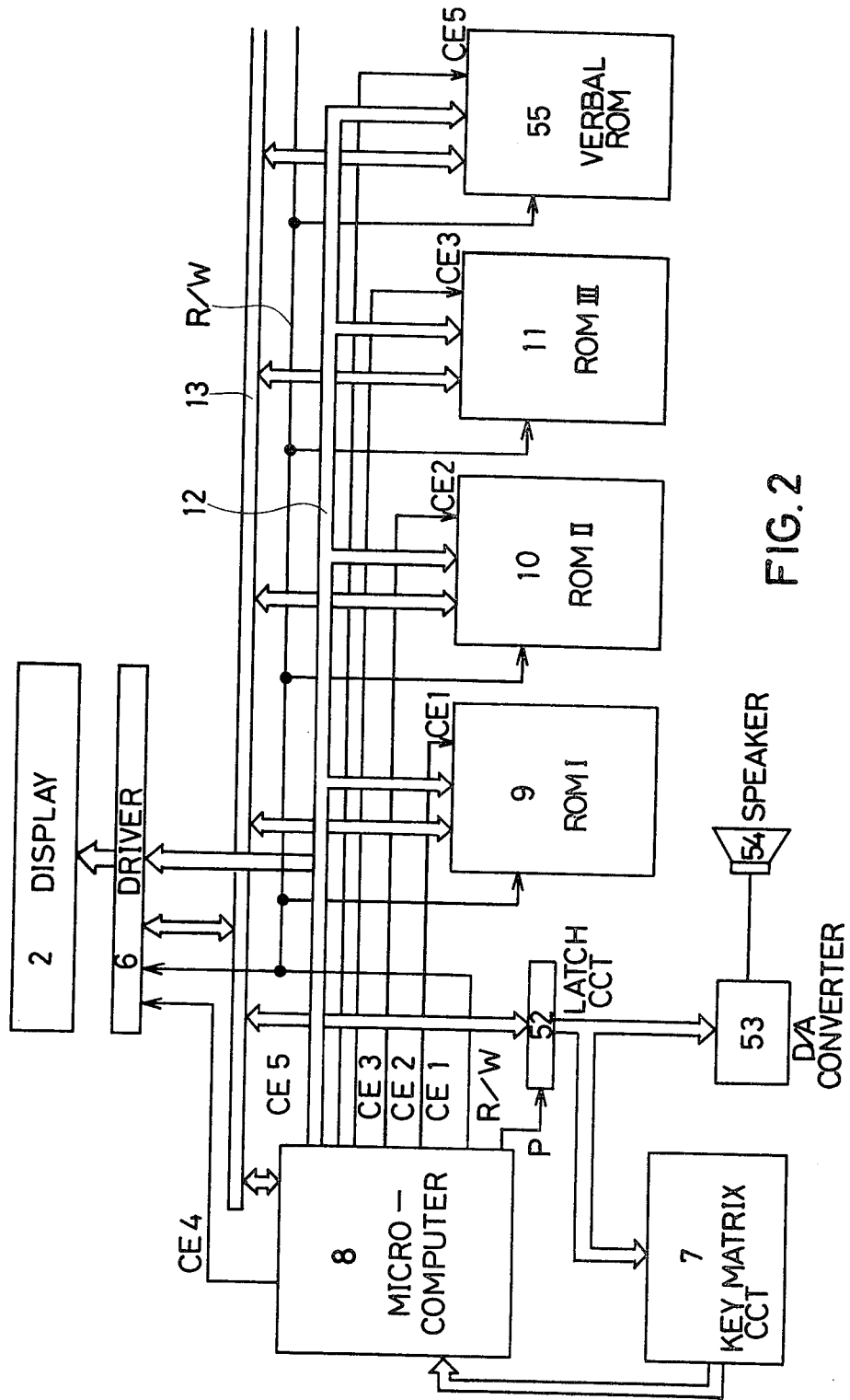
FIGS. 2, 3(a) and 3(b) show block diagram of a control circuit implemented within the translator as shown in FIG. 1.

FIG. 2 shows a block diagram of a control circuit implemented in the translator. The circuit comprises the indicator 2, a driver 6, a key matrix circuit 7, a microcomputer 8, a ROM I 9, a ROM II 10, and ROM III 11. The circuit 7 functions with the keyboard 1 of FIG. 1. The circuit 7 is connected to terminals of the microcomputer 8 for developing key strobe signals and key input signals. Each of the ROMs 9 to 11 contains words and/or sentences used by the translator.

According to a preferable example of the present invention, each of the ROMs 9 to 11 corresponds to one kind of language. For example, the ROM I 9 stores a plurality of English words, the ROM II 10 stores a number of Japanese words and the ROM III 11 stores a number of German words. Preferably, the ROM I 9 is built in the translator so that it can not be removed from the translator for exchange purposes. However, each of the ROM II 10 and the ROM III 11 can be removed from the translator and replaced by another type of ROM as module 1 or 2.

Each of the ROMs 9 to 11 is connected to the microcomputer 8 through an address bus 12 and a data bus 13. Chip selection signals $CE_1$, $CE_2$ and $CE_3$ are developed by the microcomputer 8 to select one of the ROMs 9 to 11. Words and/or sentences are applied to the microcomputer 8 from the selected ROM. $CE_4$ indicates a chip selection signal for the driver 6. R/W indicates a read/write signal for selecting read or write operation.

A ROM 55 is connected, in a detachable form, to the translator circuit. It contains a plurality of various kinds of verbal information for words and/or sentences in a language. For description purposes, a single unit of the ROM 55 is indicated in FIG. 2. The number of this type of ROM need not be limited to one. While each of the ROMs 9 to 11 contains words or sentences in a digital code, the verbal ROM 55 contains a great number of different kinds of verbal information in a digital code. A specific pronunciation is enabled by combining selected kinds of verbal information with access of the microcomputer 8 to the verbal ROM 55.

A latch circuit 52 is provided for developing verbal signals or key strobe signals. It is responsive to the application of P signals from the microcomputer 8 for latching data on the data bus 13.

A D/A converter 53 is provided for enabling D/A conversion of the output from the latch circuit 52 so that a speaker 54 is operated to speak out the verbal information. When key input signals are to be read in, the output of the latch circuit 52 is forwarded to the key matrix circuit 7 as key strobe signals.

Figure 3A:
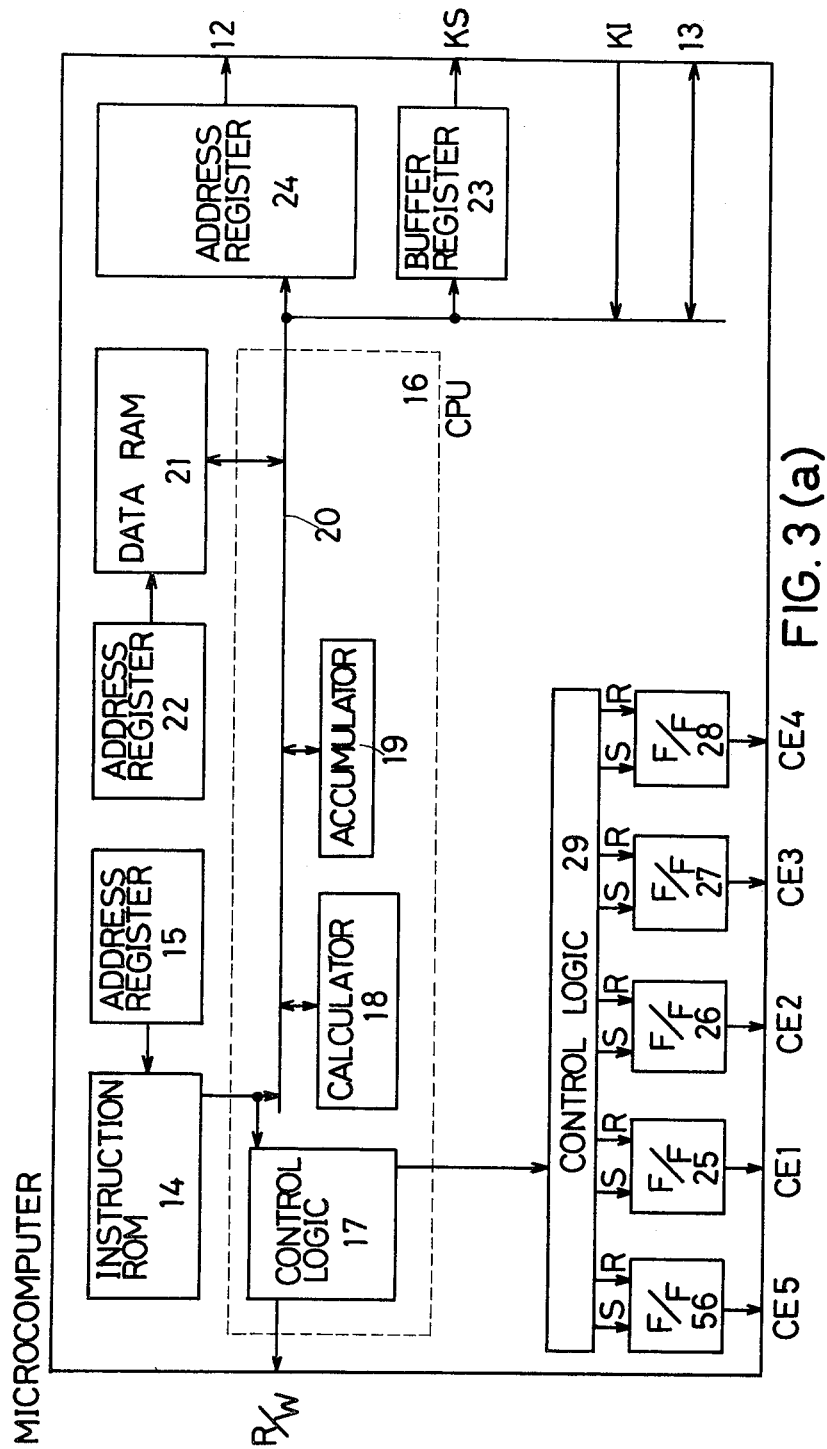

FIG. 3(a) shows a block diagram of the microcomputer 8 of FIG. 2. An instruction ROM 14 stores a number of kinds of instructions, each of which is used in a specific operation by the translator and are, preferably, in coded format. As the address of a ROM address register 15 is in turn advanced, the ROM 14 provides a specific kind of instruction. The specific instruction is applied to a CPU 16 so that the CPU 16 understands an associated instruction to provide its selected operation.

The CPU 16 comprises a control logic 17, a logic calculator 18, and an accumulator 19. Inner data bus is indicated by numeral 20. Data RAM 21 is provided for preliminarily containing data used for the translator and for functioning as a conditional flip flop used for a branch in a program operation. Data from the CPU 16 is stored in specific locations of the data RAM 21 which are selected by a RAM address register 22. The data stored in such locations of the RAM 21 are developed to the CPU 16.

Numeral 23 represents an output buffer register for outputting key strobe signals KS entered into the key matrix circuit 7 so that the output of this circuit 7 is applied to the CPU 16 as key input signal KI. Numeral 24 indicates an address register for selecting the address of the external memroy including the ROMs 9 to 11 and a RAM circuit within the driver 6. The output of the address register 24 is fed through the address bus 12. Control of the address register 24 to select an increment or decrement operation and a certain address is carried out by the CPU 16. Since the CPU 16 is coupled to the data bus 13 as shown in FIG. 2, transmission of the data between the CPU 16 and the external memory is by use of the data bus 13. The direction of transmission of the data between them is defined by the read write signal R/W.

Each of flip flop circuits 25–28 and 56 is set or reset by a control logic 29. The control logic 29 is controlled by the CPU 16. The output of each of the flip flops 25–28, 56 is referred to as one of the chip selection signals $CE_1$ to $CE_5$.

Figure 3B:
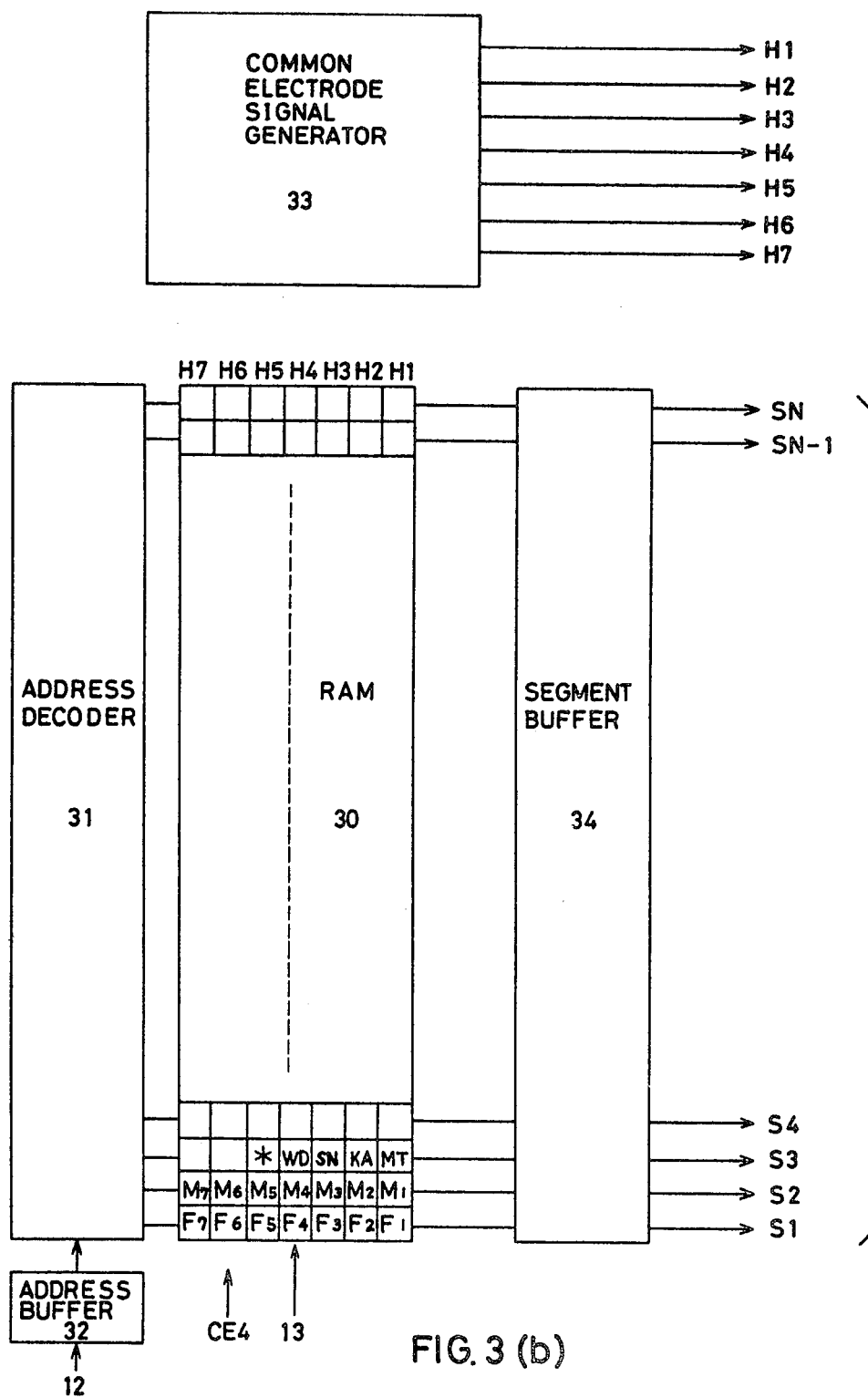

FIG. 3(b) shows a block diagram of the driver 6 of FIG. 2. According to a preferable form of the present invention, the indicator 2 comprises a liquid crystal display. The character indicator 3 is formed as a 5×7 dot matrix in a single digit. One symbol of the kind of tongue indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when a logic "1" is written in a certain bit of the RAM 30, a particular dot (segment) of the indicator 2 corresponding to the certain bit is indicated. When a logic "0" is stored in a certain bit of the RAM 30, a particular dot (segment) of the indicator 2 corresponding to the bit is made dark.

In FIG. 3(b), $S_1$, $S_2$ and $S_3$ are referred to as segment electrode signals used for illuminating symbols. $S_4$ to $S_N$ are referred to segment electrode signals used for indicating characters. $H_1$ to $H_7$ represent common electrode signals. $M_1$ to $M_7$ represents a symbol "▲" of the kind of tongue indicator 4, the symbol indicating the mother tongue or the original tongue which is not to be translated with the translator of the present invention. $F_1$ to $F_7$ represent another symbol "▼" of the same indicator 4, this symbol indicating the foreign tongue or the translated tongue which is to be translated with the translator of the present invention.

Further in FIG. 3(b), numerals 1 to 7 as the suffix are referred to English, German, Japanese, French, Spanish, another language "○", and further language "△", respectively. MT indicates a multivocal word. KA indicates a Japanese "Katakana" letter. SN represents a sentence while WD represents a word. A star "*" indicates that each of words represented in the mother tongue or the original tongue is translated to each of corresponding words represented in the foreign tongue or the translated tongue while the grammatical correction and modification for the foreign tongue is not carried out.

The driver 6 provides displaying signals to the indicator 2 when displaying data developed from the microcomputer 8 to apply the data to the RAM 30. Since the driver 6 is of conventional construction, further description is omitted.

Figure 4:
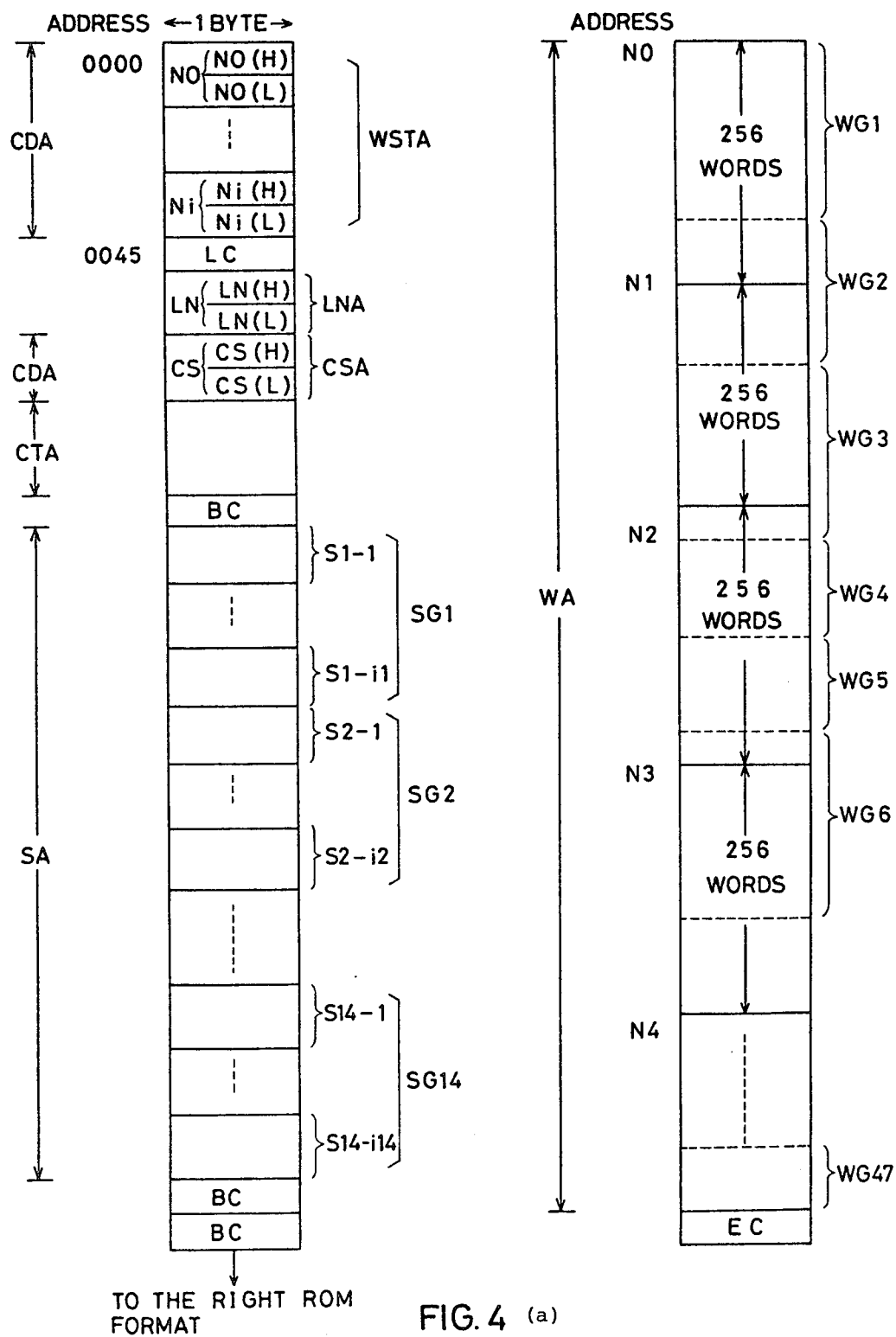
FIG. 4(a) shows a format of a ROM for memorizing words, the ROM being connected in the circuit of FIG. 2.
FIGS. 4(b) through 4(d) show formats of various types of ROM, the ROM being connectable to the circuit of FIG. 2.

FIG. 4(a) shows a format in which a great number of words are stored in each of the ROMs 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of spelling of English words is determined to detect some English spelling having high frequency in occurrence. The thus selected English spelling is changed to corresponding compression codes for memorizing purposes. The data-compression table CTA stores data for presenting correspondence between the selected spelling and the compression codes.

When correspondence between an input words and one or more words memorized in one of the ROMs is to be detected, the input word is changed to words inclusive of one of the compression codes according to the contents of the data-compression table CTA since each of the ROMs stores codes which may include one of the compression codes. The table CTA is used in the display of words stored in one of the ROMs by changing the codes to the original spelling. The contents of this table differs depending on the language to make the degree of data compression the greatest.

Stored words are classified as 47 categories in each of which a number of words are ordered. In FIG. 4(a), a word category n is referred to WGn. Sentences are formed by a combination of a plurality of stored words. These sentences are classified in 14 categories in each of which a number of sentences are ordered. In FIG. 4(a), a sentence category m is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows a relation between the serial number of the category and the name of the category.

TABLE 1-1

| The serial number of the category | corresponding key | the name of the category |
|---|---|---|
| 1 | "ra" or " " | airplane |
| 2 | "ri" or "I" | customs |
| 3 | "ru" or "A" | transporting machine |
| 4 | "re" or "J" | at hotel |
| 5 | "ro" or "S" | in restrant |
| 6 | "m" or "T" | sight seeing |
| 7 | "mo" or "U" | amuzement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words contains 256 words. A first word address table region WSTA contains a first address referred to as $N_O$, $N_1$, $N_2$, ... $N_4$ in FIG. 4(a). This first address is related to a location in which first codes or a first compressed code for representing the first word is stored. In accordance with a specific example of the present invention, each address is represented with two bytes. Each first address is separated into an upper byte referred to No(H) to Ni(H) and a lower byte referred to No(L) to Ni(L). The first word address table region is used to shorten retrieval time for a specific word.

CS is referred to a first sentence address CS(H) and CS(L) which is stored in a first sentence address region CSA. LNA indicates a memory location for storing a serial number of a word indicating the kind of the specific tongue as referred to LN of LN(H) and LN(L). More particularly, as the ROM storing English words is concerned, a word "English" is necessarily contained in that ROM. In such a case, the serial number of the English words in the ROM is LN starting from the first word of the same kind of word group. Memorizing the serial number LN is suitable for showing the kind of the mother tongue and the foreign tongue being selected in the character indicator 3 because it is unnecessary to additionally memorize a word showing the kind of tongue.

The translator of the present invention may comprise audible sound generating means for developing words represented in the mother tongue and/or the foreign tongue. Since such an audible sound generating means is disclosed in, for example, Hyatt U.S. Pat. No. 4,060,848 issued Nov. 29, 1979, further description is omitted.

In FIG. 4(a) LC indicates a tongue code in which upper 4 bits indicate a field of language stored in the ROM and lower 4 bits the kind of language stored in the ROM. In particular, there may be present a ROM for storing words oriented to economy, engineering or medicine, respectively. Information representing such a field is stored in LC. The lower 4 bits corresponds to each kind of tongue as follows:

TABLE 1-2

| The lower 4 bits | the kind of language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another tongue "O" |
| 0 1 1 1 (7) | a further tongue "△" |

In FIG. 4(a) BC, "11111111" is a boundary code and EC "11111111" is an end code of the ROM.

Figure 4D:
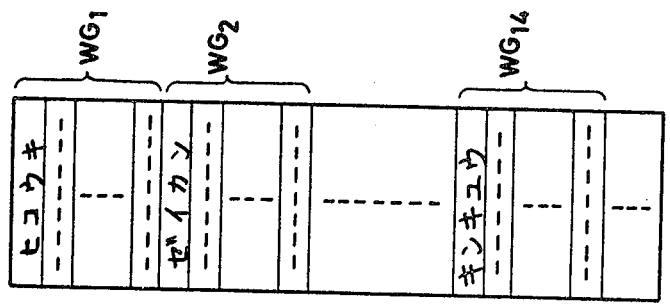
Figure 4C:
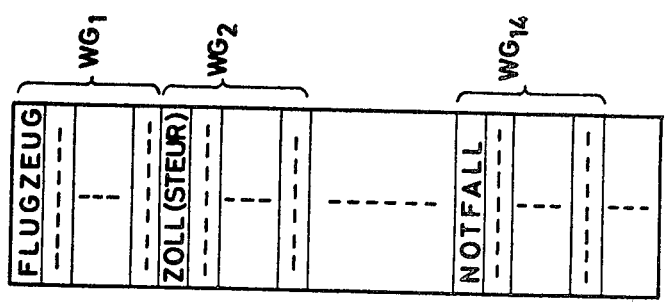
Figure 4B:
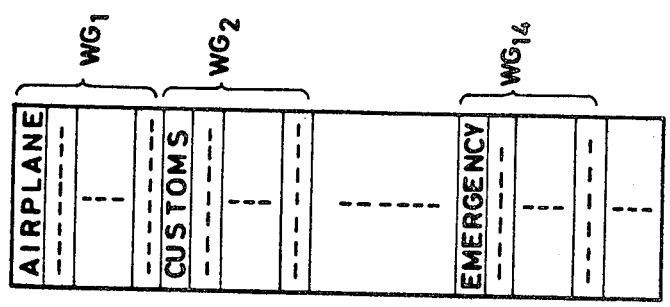

FIGS. 4(b) through 4(d) show formats of word catagories in various types of ROMs containing English words, German words and Japanese words, respectively. These catagory words are featured in that each first word stored in each category is the name of each category.

Figure 5:
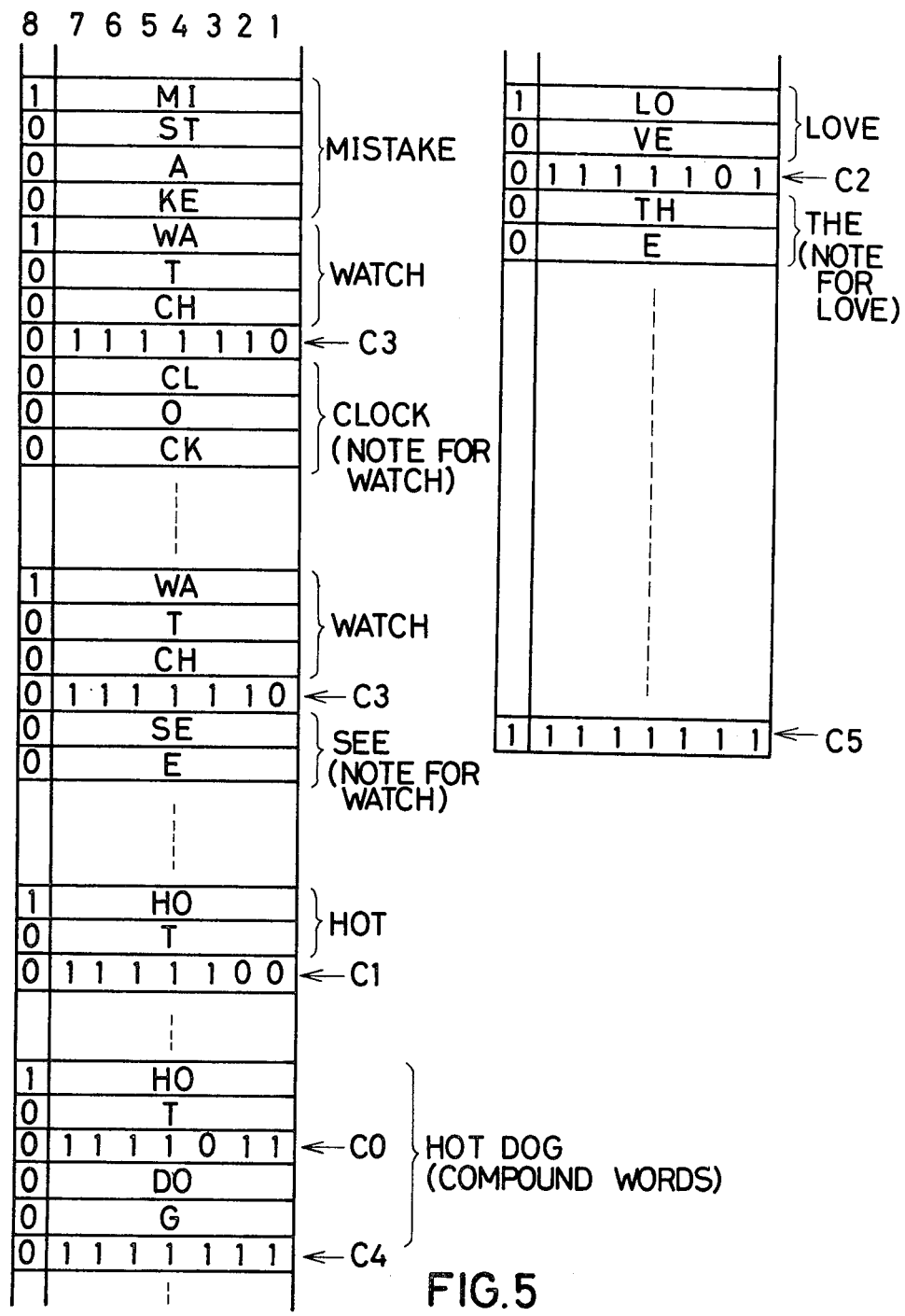
FIG. 5 shows a detailed format of a word data region WC in the format of FIG. 4(a)

FIG. 5 shows a detailed format in a word data region WA in the format of FIG. 4(a) where the ROM stores English words.

In the word data region WA, word data are ordered in units of 1 byte. The eighth bit of the first word in each word category is defined as "1" while the eighth bit of the second or more words is defined as "0". The first bit through the seventh bit are used to contain letter codes representing letters or compression codes representing letters in a compressed manner. For example, a word "WATCH" is memorized such that a pair "WA" are represented by a single compression code of 1 byte, a pair "CH" are represented by another type of single compression code of 1 byte and a letter "T" is represented a letter code of 1 byte. Therefore, five letters of "WATCH" are stored with three bytes.

Each word having a specific meaning corresponds to each translated word. A word identical with another at least in spelling and a homonym, which is a word with another in spelling and pronunciation, are stored with each note for identification. FIG. 5 represents a word "WATCH" having two meanings of "CLOCK" and "SEE" so that each note is added as "WATCH (CLOCK)" and "WATCH (SEE)" with a bracket. These notes follow each note code $C_3$ (7E in a hexadecimal notation) in the word data region. The bracket for the note follows the noted word, normally. But, it may precede the noted word in which case the note follows the note code $C_2$ (7D in the nexadecimal notation). In FIG. 5, a note "THE" for a word "LOVE" is provided to be "(THE)LOVE".

A compound formed by at least two words corresponds to each translated word. FIG. 5 shows an example of a compound "HOT DOG". Between the at least two words "HOT" and "DOG", a space code Co(7B in the hexadecimal notation) is inserted. If at least one of the two words is memorized in one of the ROMs and is the first word of the compound, the last letter code of the word (the compression code) is followed by a compound code $C_1$ (7C in the hexadecimal notation). The word "HOT" in FIG. 5 is this type of word to thereby be followed by the compound code $C_1$. The compound code $C_1$ is aimed to indicate that there are present one or more compounds starting with the word "HOT".

As described above, the stored words are classified in 47 categories. A category separation code $C_4$ (7F in the hexadecimal notation) is provided for showing separation of each category. This code follows all the words in the same category. In FIG. 5, this code follows the compound "HOT DOG". At the end of the word data region WA, an end code $C_5$ (FF in the hexadecimal notation) is provided.

FIG. 6 shows a table containing the letter codes, the compression codes, and the control codes each of which is used in the format of FIG. 5.

In the word data region, each of the data word data occupies 1 byte. It may be possible to provide 256 kinds of alternation in connection with one kind of data by the eight bits. But, the eighth bit is used to indicate the start of the data of each word. The remaining seven bits can be selectively combined to provide 128 kinds of alternation in connection with one kind of data.

The codes in the shaded parts in the table of FIG. 6 are the figure codes, the symbol codes, and the control codes all of which are used in common with the respective tongues. In the remaining parts, the latter codes (alphabets in FIG. 6) and the compression codes are provided. The control codes $C_0$ to $C_5$ function as described in FIG. 5.

FIG. 7 shows a detailed format of the compression table, related to the English words, in the format of FIG. 4(a). The format of FIG. 7 corresponds to the compression table of FIG. 6.

In FIG. 7, the lower seven bits in the eighth bit of "1" represent the letter codes. The lower seven bits in the eighth bit of "0" are the compression code for the preceding letter codes. An end code $C_6$ is provided for representing the end of the compression codes. The compression table differs, depending on the type of tongue so as to maximize efficiency.

FIGS. 8(a) through 8(d) show detailed formats of the sentence data region SA in the format of FIG. 4(a) related to English or Japanese.

A plurality of words form a sentence where each of the words is memorized with the compression code.

At the start of a word, the eighth bit is represented as "1". Some letter codes or compression codes representing a particular word are contained before next occurrence of the eighth bit of "1". For separation of the sentences, two type of codes $C_7$ and $C_8$ are used in which $C_7$ is added following an affirmative sentence and $C_8$ is added following an interrogative sentence. The code $C_7$ is "FE" in the hexadecimal notation and $C_8$ is "FC" in the same.

Figure 8A:
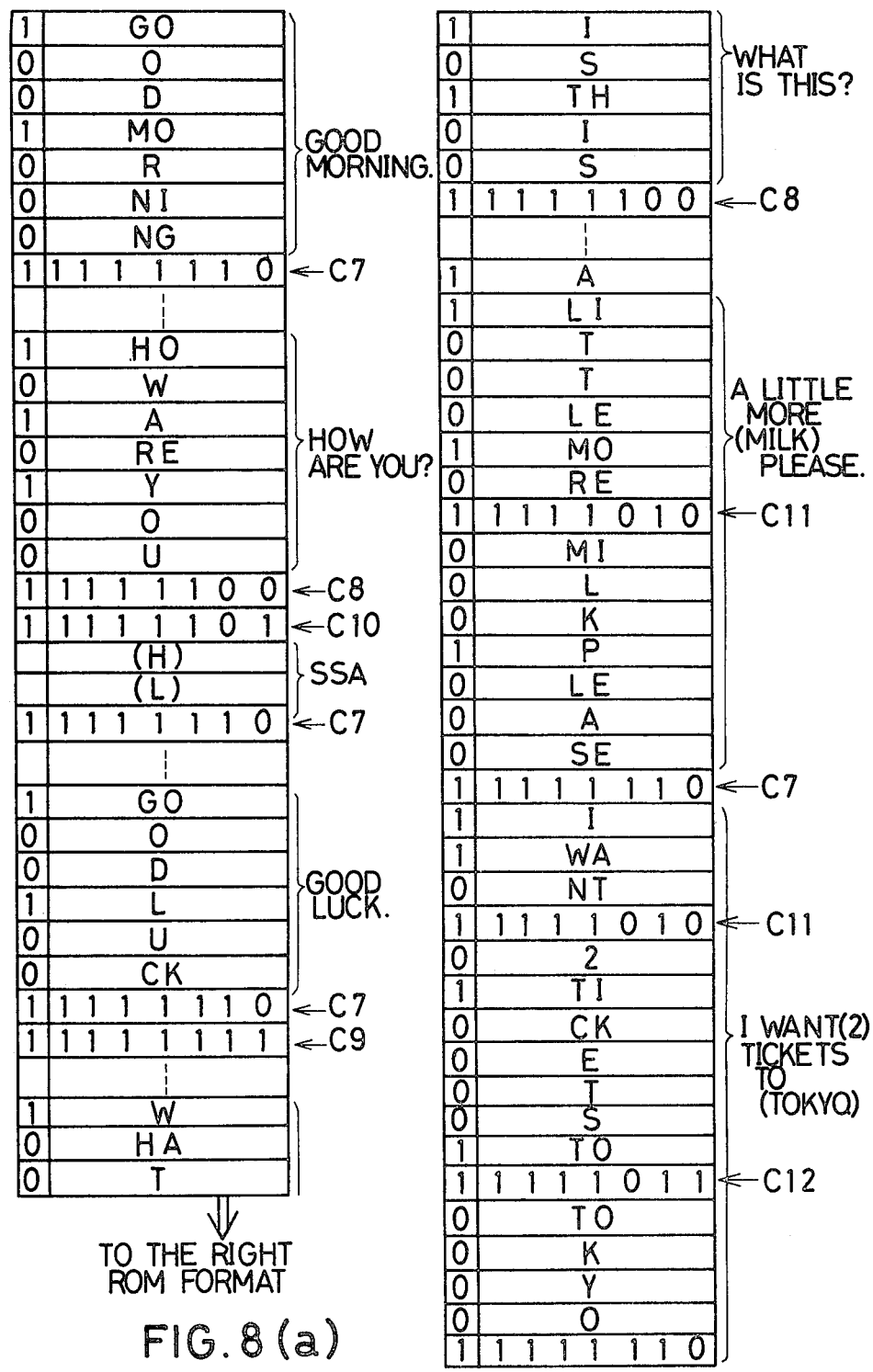

As described above, the memorized sentences are classified as 14 categories. A category separation code $C_9$ is used for indicating separation between the categories. The code $C_9$ is represented as "FF" in the hexadecimal notation. This code $C_9$ follows the code $C_7$ or $C_8$. FIG. 8(a) shows a sentence "GOOD LUCK." which is memorized at the end of a particular sentence category.

It may be possible that the same sentence is included in two or more categories. In such a case, to reduce the number of bytes for the memory, the sentence is memorized as such in a category while the leading address of the stored sentence in this category is memorized in another type of category. An address memory code $C_{10}$ (FD in the hexadecimal notation) is used for this control purpose. Tow bytes following the code $C_{10}$ are used to memorize an address "SSA" for the code (compression code) of the leading letter of the first word contained in the sentence which is in common.

As a feature of the translator according to the present invention, one or more words in an exemplary sentence in an original language can be altered by substitution of one or more other words in the original language to form another type of sentence in the original language. The thus modified sentence may then be translated. Such words which can be altered are provided with brackets in a displayed form. At most, two words can be altered in a single sentence as shown in FIG. 8(a).

FIG. 8(a) shows an exemplary sentence of "A LITTLE MORE (MILK) PLEASE.". A word provided within brackets is specified by a bracket 1 code $C_{11}$ (FA in the hexadecimal notation). With the eight code of "0" following this code $C_{11}$, the lower seven codes are the letter codes (the compression code). When two words are to be inserted within the brackets as being a phrase or an idiom, the code $C_{11}$ is inserted between the words. For example, a phrase of "CHECK IN" is inserted between the words to thereby form a code line of "Code $C_{11}$, check, Code $C_{11}$, IN" as indicated in FIG. 8(b).

FIG. 8(c) shows another example, say, "I WANT (2) TICKETS TO (TOKYO)." when represented in English. (2) is represented by use of the code $C_{11}$ while (TOKYO) is represented by use of another bracket code $C_{12}$ (FB in the hexadecimal noration). No limitation requires the code $C_{11}$ to necessarily preceeds the code $C_{12}$. FIG. 8(c) shows a example represented in Japanese. As indicated in FIG. 8(c), the code $C_{12}$ precedes the code $C_{11}$ since the order of words are different between English and Japanese.

In this type of translator, the first brackets in an English sentence are represented with the code $C_{11}$ and the second brackets in the English sentence are represented with the code $C_{12}$. In a tongue other than English, the first brackets which are former in the English translated sentence are represented with the code $C_{11}$ and the second brackets which are latter in the English translated sentence are represented with the code $C_{12}$. When only one bracket pair are used in a sentence, the code $C_{11}$ is necessarily used.

[OPERATION OF THE TRANSLATOR]

(1) Display

With reference to FIG. 1, the letter indicator 3 displays alphabets, Japanese "Katakana" letters, figures and symbols. The kind of tongue indicator 4 displays the marks "△" and "▽". The symbol indicator 5 contains the symbols MT, KA, SN and WD specified with the symbol "▽", and the star "*". Indication of these symbols is enabled with control of the driver 6 by developing corresponding data from the microcomputer 8.

(2) Translation principle

The system of FIG. 2 has capability of translating three kinds of languages to one another. A specific type of ROM memorizes a great number of words and sentences as shown in FIG. 4(a). Each of words and sentences corresponds to each of translated words and translated sentences. This correspondance is assured by the numbers of words and sentences which are in common between the ROMs. More particularly, a specific sentence "GOOD MORNING," is assumed to be memorized as the 100th sentence in a ROM related to English.

Corresponding Japanese translated words are stored in the 100th sentence in another type of ROM related to Japanese. A further corresponding German translated phrase "GUTEN MORGEN," is stored in the 100th sentence in a further type of ROM related to German.

Silimarity can be applied in connection with words so that a specific word ordered in a serial number in a ROM corresponds to a translated word ordered in the serial number in another type of ROM.

Conducting the translation by the translator lies in finding the serial number of a word or a sentence in the mother tongue ROM and, accordingly, in detecting a translated word or sentence having the serial number in the foreign tongue ROM.

The translation operation comprises the following steps:
(i) the first step: selecting a specific kind of ROM of the mother tongue
(ii) the second step: detecting the serial number of a word or a sentence in the thus selected ROM
(iii) the third step: selecting another specific kind of ROM of the foreign tongue, and
(iv) the fouth step: detecting a translated word or a translated sentence having the serial number in the another kind of ROM.

(3) Translation of a Specific Sentence Addressed with Selection of a Catagory With reference to FIG. 1, keys specified with each of $L_1$ through $L_{14}$ are category selection keys. If necessary, a picture suggesting the kind of category may be provided adjacent each of category selection keys. Selection by each of these keys is enabled following actuation of an SN/WD key 41 where the indicator 5 indicates the mark "▼".

A SRC key 42 is actuated for subsequently searching a plurality of sentences belonging to the same category. After the last sentence in the category is outputted, the first sentence in this category is then addressed. When a sentence is addressed, the serial number of this sentence is outputted. A TRL key 43 is actuated for enabling the third step and the fourth step as described in item 2 to provide translation of this sentence.

Translation of a specific sentence addressed with selection of a category is enabled according to the following steps:
(i) the first step: selecting a specific kind of ROM of the mother tongue
(ii) the second step: illuminating the mark "▼"by actuating the key 41
(iii) the third step: actuating one of the category keys $L_1$ through $L_{14}$
(iv) the fourth step: addressing subsequently the SRC key 42 so that the serial number of the specific sentence is detected and the translation key 43 is actuated
(v) the fifth step: selecting another kind of ROM of the foreign tongue
(vi) the sixth step: detecting a translated sentence having the serial number in the another kind of ROM

(4) Translation of an Inputted Word

Spelling of a word is entered by actuating letter keys 44 and the translation key 43 is actuated to provide a translation from the mother tongue to the foreign tongue as indicated in the indicator 4. Some cases may be different from one another depending on the type of spelling entered as follows.
(i) the spelling entered is not found in the ROM of the mother tongue
(ii) only one type of spelling identical with the spelling entered is present in the ROM of the mother tongue.
(iii) a plurality of kinds of spelling identical with the spelling entered are present in the ROM of the mother tongue In connection with item (i), no word has been memorized which is identical to the entered word. This is indicated by a double exclamation mark "!!" following the end of the entered word which is displayed after actuation of the translation key 43.

In connection with item (ii), the serial number of the identical spelling in the ROM of the mother tongue is detected, selection of ROM having the foreign tongue is enabled, and a translated word having the same serial number in the selected ROM of the foreign tongue is detected and displayed.

More particularly, suppose that English is selected as the mother tongue and Japanese is selected as the foreign tongue. A word "SEE" is entered and the translation key 43 is actuated. Under the circumstances, the first word in the English ROM is addressed so that equivalency between spelling of the entered word and the first word is determined. When there is no equivalency, a counter for storing the serial number of the word is advanced by one to address the second word. If the word of "SEE" is detected in the English ROM by advancing the address of the counter up to the serial number, say, 500 of this word, equivalency is detected. The Japanese ROM is then selected so that a transalted word is developed by specifying the serial number 500 of the Japanese ROM. Translation is thus enabled.

In connection with item (iii), homonyms are noted in the memorized format as indicated in FIG. 5. A specific concrete meaning is determined by the operator of the translator. A specific display with a note and a mark "!?" following the entered word is enabled to indicate that the entered word has a plurality of translated words.

In particular, a word "WATCH" of FIG. 5 is assumed to be entered. Firstly, this word is entered and the translation key 43 is actuated to indicate
"WATCH (CLOCK) !?".

Now the search key 42 is actuated to indicate another translated word equivalent to the word "WATCH".
"WATCH (SEE) !?"

While either of these alternative displays is displayed, the translation key 43 is actuated to obtain a corresponding translated word. At the same time, when the homonym is entered as noted by notes, the indicator 5 illuminates the symbol "▼" directed to MT indicating that there are one or more additional translated words equivalent to the entered word.

(5) Translation of two or more entered words

The instant translator can translate two or more entered words. The space key 45 is actuated to separate these words from one another. When the first word is entered and the space key 45 is actuated, the second word can be entered if the first word entered is contained in the ROM of the mother tongue. If the first word is not stored in the ROM or belongs to the homonym, operation similar to items (i) and (iii) is conducted.

Under the circumstances that all of the words "I", "AM", "A" and "BOY" are assumed to be memorized in the English ROM, entry operation of "I", "SPC", "AM", "SPC", "A", "SPC" and "BOY" is conducted to indicate in the display 3.
"I AM A BOY".

Upon actuation of the translation key 43, translated words are obtained on the display 3 while the order of the translated words is identical to the order of the entered words. That is, regardless of the grammatical order by the grammer in the translated tongue, the translated words respectively corresponding to the entered words are directly aligned. The start "*" is indicated in the indicator 5 representing this situation.

(6) Entry of words with the brackets and translation thereof

Figure 8D:
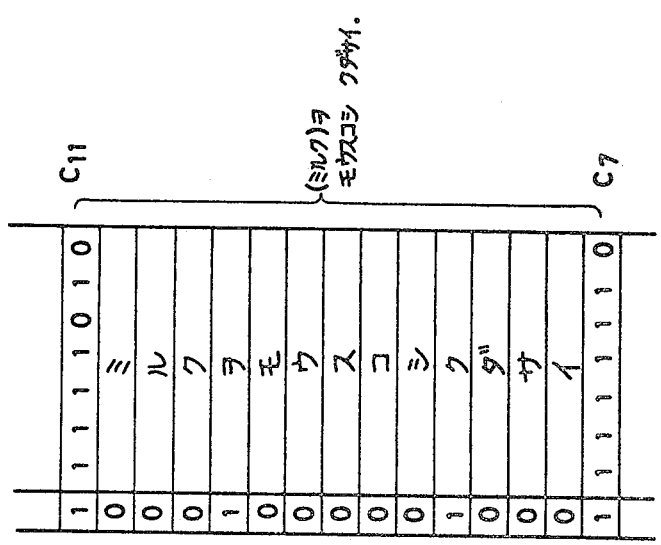

With reference to FIG. 8(a), an exemplary sentence "A LITTLE MORE (MILK) PLEASE." is addressed to indicate "A LITTLE MORE ((MILK)) PLEASE." Upon actuation of the translation key 43, a translated sentence which is stored in the format of FIG. 8(d) in the Japanese version, is indicated in which a translated word corresponding to "((MILK))" is indicated with a single bracket.

While the exemplary English sentence is indicated, a word "COFFEE" is entered by the alphabetical keys to indicate "A LITTLE MORE ((COFFEE)) PLEASE."

Upon actuation of the translation key 43, a corresponding translated sentence is formed and displayed only on the condition that the word "COFFEE" is memorized in the English ROM. When not, operation similar to item (i) or (iii) of item (4) should be conducted.

Modification and translation of the word provided with the brackets are effected follows:

A sentence with the brackets is addressed by following the first to the fourth steps of item (3):

(v) the fifth step: the word contained within the brackets in the addressed sentence is replaced by the word entered before the translation key 43 is actuated
(iv) the sixth step: in the ROM of the mother tongue, a word having the spelling of the entered word is detected and the serial number thereof is detected In case where such a word can not be detected in the ROM or otherwise there are two or more words having the spelling of the entered word, operation similar to item (i) or (iii) of item (4). The following steps should be effected corresponding to item (ii) of item (4).

(vii) the seventh step: selecting the ROM of the foreign tougue
(viii) the eighth step: extracting a sentence having the same serial number as the memorized serial number from the ROM of the foreign tongue so that the sentence is applied to the buffer register. The $C_{11}$ code or the $C_{12}$ code is also applied to the buffer register.
(iv) the ninth step: extracting the word having the same serial number as that of the word which is detected in the six step and inserting the extracted word between the brackets represented by the bracket code applied to the buffer register in the eighth step With respect to the sentence having the two kinds of brackets, the bracket key 46 is actuated for inserting a desired word between the brackets. The following sentence is excemplified.

"I WANT ((2)) TICKETS TO (TOKYO)"

The former brackets are displayed as double brackets while the latter ones are displayed as a single bracket. And then an entered word or phrase may be inserted between the double brackets. Upon actuation of the bracket key 46, the single brackets are replaced by the double brackets while the double brackets are replaced by the single brackets. Thus, the word contained in the latter and double brackets can be replaced by a new entered word. Position of the double brackets is changed each time the bracket key 46 is actuated. Translation of the entered word or phrase is conducted by the manner as described above.

(7) Retaining the word without translation

A holding key 47 referred to HLD is actuated for identifying a person's name or a proper noun which can and should not be translated. Actuation of the holding key 47 follows entry of this kind of word. Even when the translation key 43 is actuated, this kind of word is not translated to indicate the entered word as such. If the translation key 43 is actuated following entry of this kind of word, the double exclamation mark is added to the end of the entered word, which is indicated, as described in item (4). In such a case, the translation key 43 is further actuated and the above holding operation is effective in the same manner as in the case of actuation of the holding key 47.

(8) Automatically retaining the entered word without translation

FIGS. "0" through "9" and symbols "$", "." (period) ":" (colon), "?" (question mark) are not subjected to translation under the condition they are not added to any other words. There is no need to actuate the holding key 47.

(9) Addressing words classified in the categories

As shown in FIG. 4(a), the words are classified as 47 categories so that each of the words can be addressed in the similar manner as in the case of addressing each of the sentences according to the category.

(10) Searching each of the words entered by the keyboard

Each of words entered by the keyboard can be randomly accessed according to its spelling.

Figure 9:
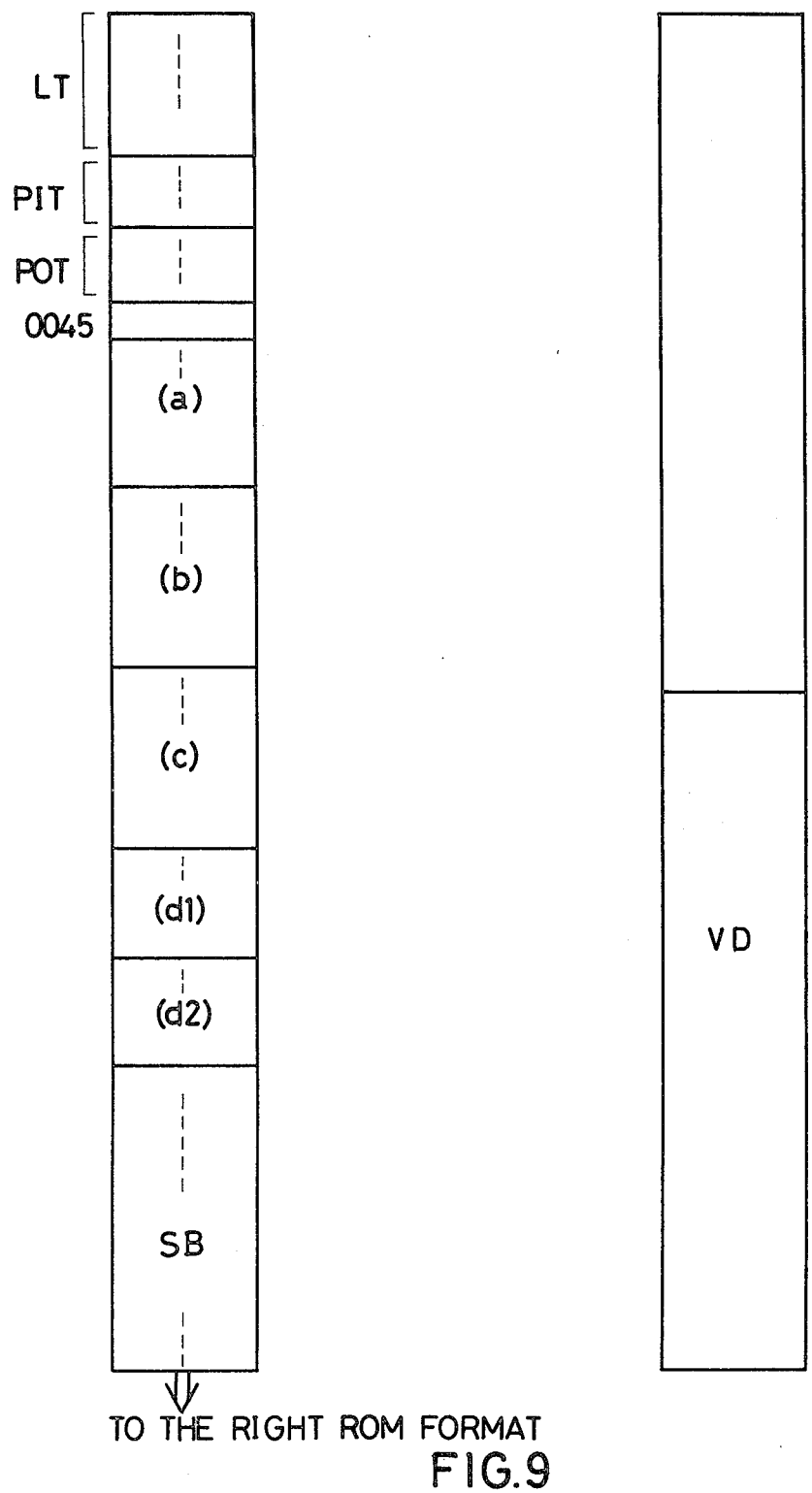
FIG. 9 shows a format of a verbal ROM connected to the circuit of FIG. 2.

FIG. 9 shows the format of the verbal ROM 55 as indicated in FIG. 2. The format of this ROM 55 is divided to several regions consisting of an amplification control table region LT, a pitch control table region PIT, a rest control table region POT, a word starting address table region (a), an example sentence starting address table region (b), a letter starting address table region (c), a word verbal information or not indicating table region ($d_1$), a sentence verbal information or not indicating table region ($d_2$), a sentence verbal information table region SB, and a verbal information table region VD containing a great number of kinds of verbal information.

The amplification control table region LT provides information for controlling amplification in voice synthesization. The pitch control table region PIT provides information for controlling pitch in voice synthesization.

The rest control table region POT provides information for controlling a time of a rest in voice synthesization. The verbal information table region VD provides verbal information in voice synthesization.

FIGS. 10(a) through 10(d) show examples of details of the word starting address table region (a), the example sentence starting address table region (b), the letter starting address table region (c), and the word (or sentence) verbal information or not indicating table region ($d_1$) (or ($d_2$)), respectively.

FIG. 10(a): Head addresses of verbal information to eanble voice synthesization of words are stored as a table. After it is detected whether a word is to be spoken out or not, as described below, only words for accompanying voice synthesization are stored in turn from the leading address. Some word-serial numbers, say, 15, 21, 90 . . . correspond to word with voice pronunciation.

FIG. 10(b): Head addresses of verbal information to enable voice synthesization of exemplary sentences are stored as tables. According to this stored information, selection or identification of one head address enables voice synthesization of a selected sentence.

FIG. 10(c): This table for each of alphabetical letters, codes for every letter and a starting address of verbal information for every letter are both stored. A particular starting address for a letter to be spoken out is obtained by searching the code of the letter from this table.

FIG. 10(d): This table provides information as to whether voice synthesization is accompanied with a word or sentence. Everyone of the serial numbers shown in FIG. 10(d) indicates a serial number of a word or sentence. The distinction between presence and absence of voice synthesization is held by detecting whether each bit is placed in a set condition or a reset condition.

The voice synthesization with any one of the ROMs 9 to 11 and the verbal ROM 55 is carried out in the following manner:

A specific sentence is assumed to be stored at the ninth location among the sentences in the ROM. The sentence verbal information or not indicating table region $d_2$, as shown in FIG. 10(d), is utilized to detect whether the specific sentence is to be spoken out or not.

It is assumed that sentences referred to 1, 2, 4, 5, 7, 9, . . . in the table of FIG. 10(d) are to be voice synthesized. Since the ninth sentence belongs to the sixth one of these sentences, the sixth address in the sentence starting address table (b), as shown in FIG. 10(b) is selected. Then, the selected address enables access to all locations in the table SB for storing the verbal information of the respective sentences. A selected address developed from the locations in the table SB is used to access the table VD for storing verbal information in use for the voice synthesization so that a specific item of verbal information is developed.

Figure 11:
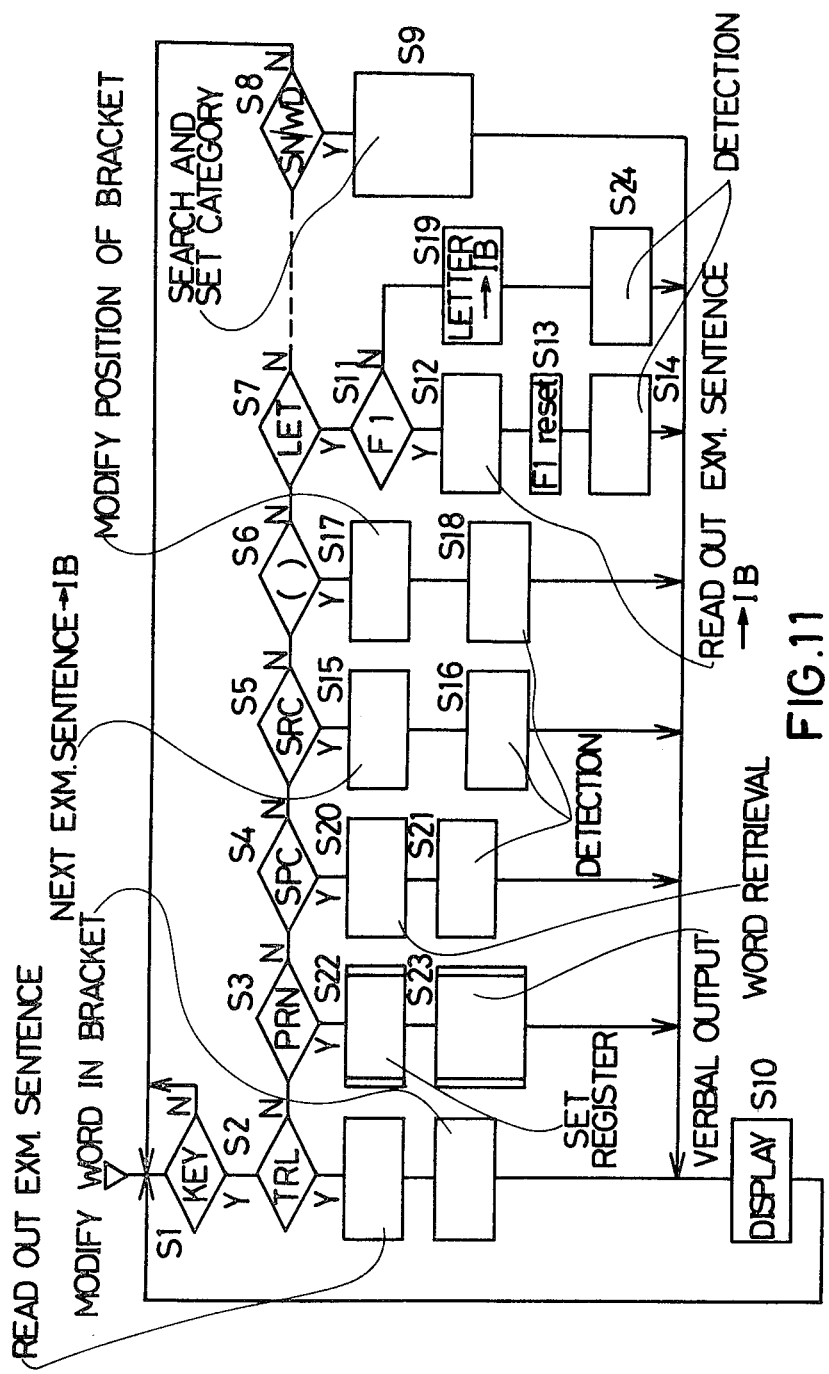
FIGS. 11 through 13 show flow charts of operation by this translator according to the present invention.

FIG. 11 shows a flow chart representing the operation of the translator according to the present invention.

When a particular sentence in a specific category is developed, an "SN/WD" key 41 is repeatedly actuated to set, in a step $S_9$, a flat $F_1$ in some location in the data RAM 21 of the circuit of FIG. 3(a) so that a sentence mode in which one or more sentences are to develop is selected.

Step $S_7$ executed where any one of the category keys $L_1$ to $L_{14}$ of FIG. 1 is selected. Step $S_{12}$ is executed so that a head sentence in a selected category is developed from the memory and entered into an input buffer IB in the microcomputer 8. Step $S_{13}$ is executed to reset the flag $F_1$. Step $S_{14}$ is selected to determine whether the sentence has a bracket in which a changeable word is positioned and the sentence is to be spoken out.

Actuation of a search key 42 selects a step $S_{15}$. Step $S_{15}$ is selected so that a next sentence in the same category is admitted to the input buffer IB. Step $S_{16}$ conducted to determine where it is possible to speak out the next sentence or not. If possible, an audible symbol 51 in FIG. 1 is illuminated.

When a particular sentence is indicated in the display 3, the sentence having a bracket for encompassing a changeable word, the word can be replaced. For this purpose, a bracket key 46 is actuated in steps $S_6$ and $S_{17}$ to select the position of the bracket containing a word to be changed. Any word used to replace the old word is inputted by actuating some letter keys. Translation of the thus modified sentence is enabled by actuating a translation key 43. Pronunciation of the translated words of the modified sentence is enabled by actuating a pronunciation key 50. If the modified sentence before translation is to be spoken out, this pronunciation key 50 is operated before actuated of the translation key 43.

In place of access of any stored sentence, any sentence can be directly inputted by actuating some letter keys 1 and a space key 45 in combination. Actuation of the space key 45 enables retrieval of words and detection of conditions as referred to in steps $S_4 \rightarrow S_{20} \rightarrow S_{21}$.

Condition detection routines $S_{14}$, $S_{16}$, $S_{18}$, $S_{21}$ and $S_{24}$ each detect the following conditions. The routine $S_{21}$ is used to detect whether any entered word just prior to actuation of the space key 45 is to be spoken out or not by accessing the tables for the verbal information in FIGS. 9 and 10(d).

Each of the routines $S_{16}$ and $S_{14}$ is used to detect whether an outputted sentence has a bracket containing a changeable word and the number of the bracket is two. When it is detected that a sentence having two brackets is outputted, VS=1 is selected as more specifically explained later. The routine $S_{18}$ is used to detect whether a bracket having a changed word is a first one or a second one. The routine $S_{24}$ is used to determine the value of US, depending on what a bracket having a changed word is a first one or a second one. The value of VS represents a code in a form of voice synthesization as more specifically described later. This routine $S_{24}$ can be employed to detect whether a complete word unit consisting of letters has been inputted.

Figure 14:
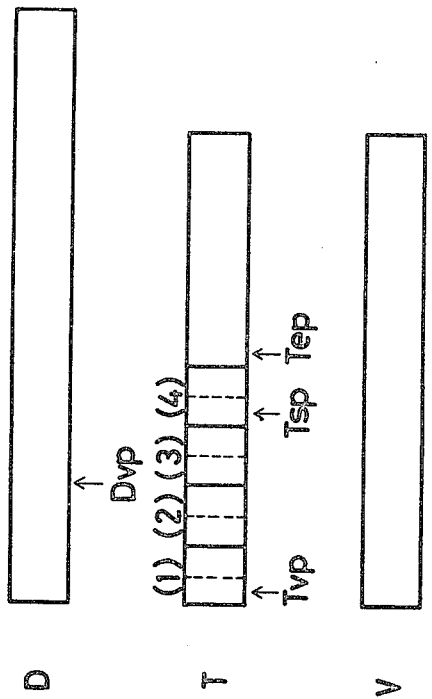
FIG. 14 shows an arrangement of three register circuits in the control circuit of FIG. 2.

The voice synthesization is conducted in the following manner. Actuation of a translation key 43 enables to set registers in step $S_{22}$. These register is part of the data RAM 21 in the circuit of FIG. 3(a). FIG. 14 shows these registers comprising three registers D, T and V.

The register D stores any data last indicated on the display 3. The register T stores a verbal information starting address for a sentence, a verbal information starting address for a word, and the like. By detecting whether the voice synthesization is to be developed according to the table of FIG. 10(d) and detecting the respective verbal information starting addresses according to the tables of FIGS. 10(a) to 10(c), the contents of this register T are set.

The head two bytes of the register T store the verbal information starting address of a sentence or a word. The register T comprises three pointers Tep, Tvp, and Tsp each functioning as follows:

Tep: indication termination of information for a word contained within the second bracket in a sentence.

Tvp: indicates a position at which the T register is to be read

Tsp: indicates a starting point of information for a word contained within the second bracket in a sentence.

Figure 12:
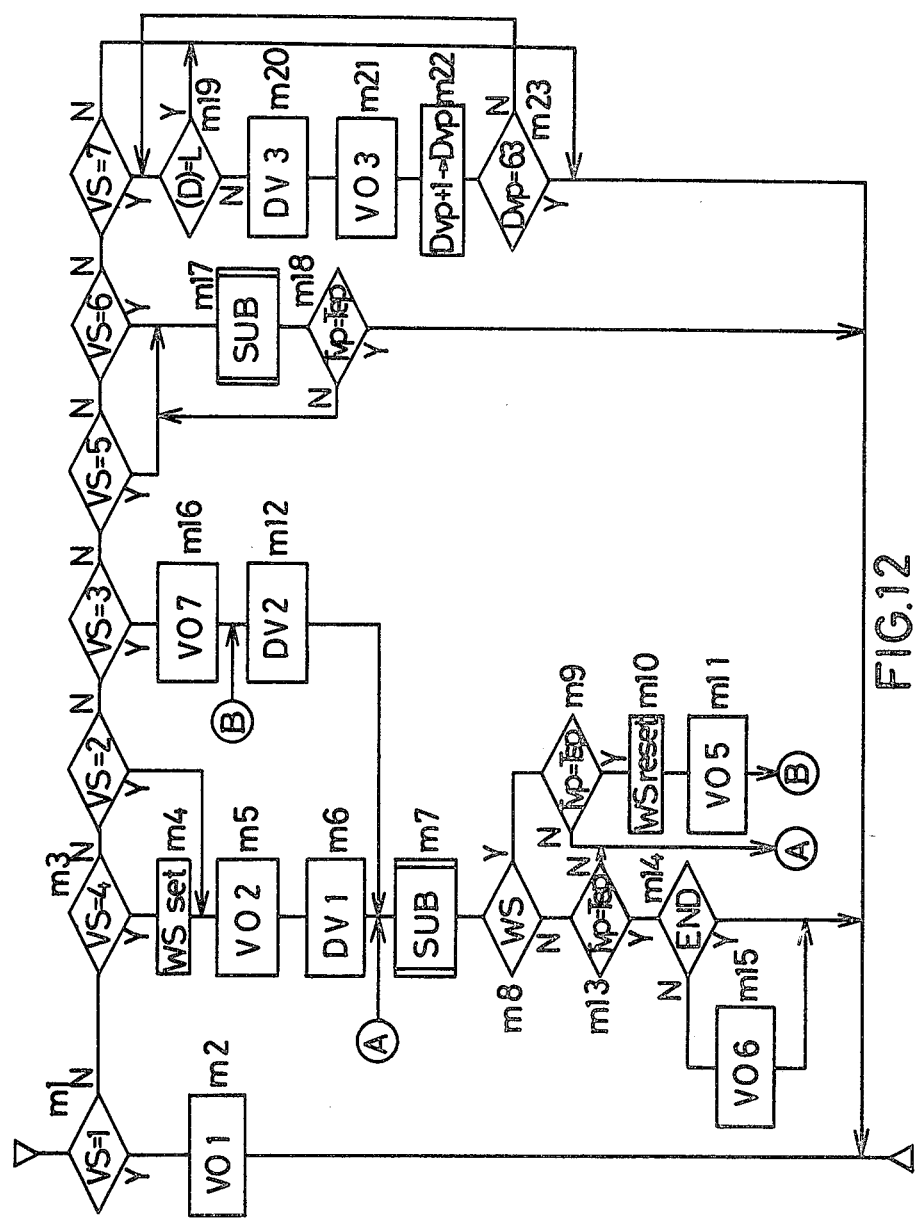

FIG. 12 shows a more detailed flow chart of a routine $S_{23}$ of FIG. 11 in which the voice synthesization is outputted. In FIG. 12, VS is a code for representing a specific condition of voice synthesization, depending on a value of VS in the following manner.

VS=1: a code for representing a condition in which a sentence is to be spoken out according to the voice synthesization, the sentence having no parentheses with a changeable word or in which a sentence is to be spoken out according to the voice synthesization, the sentence having any parentheses with a changeable word, although the changeable word is not changed.

VS=2: a code for representing a condition in which a sentence is to be spoken out according to the voice synthesization the sentence having only one unit of parentheses with a word which has been changed, or the sentence having two parentheses each with a changeable word the first one of which contains a word changed.

VS=3: a code for representing a condition in which a sentence is to be spoken out according to the voice synthesization, the sentence having two parentheses each with a changeable word, the second one of which contains a word changed.

VS=4: a code for representing a condition in which a sentence is to be spoken out according to the voice synthesization, the sentence having two parentheses each with a changeable word, each of which contains a word changed.

VS=5: a code for representing a condition in which no sentence is outputted and some complete words each to be spoken out according to the voice synthesization are inputted.

VS=6: a code for representing a condition in which a sentence comprising some complete words is inputted, the words being ones with the voice synthesization and ones without any voice synthesization.

VS=7: a code for indicating a condition in which none of the words is to be spoken out according to the voice synthesization.

Figure 13:
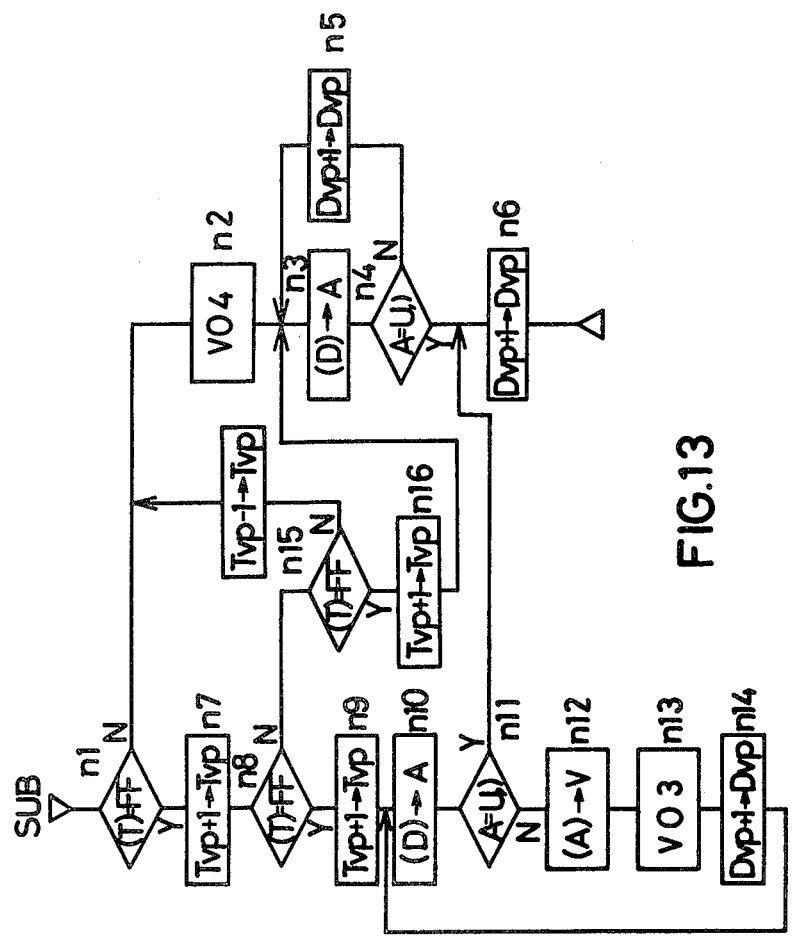

In FIGS. 12 and 13, each mark of VO1, VO2, VO3, VO7 indicates a type of operation in the voice synthesization.

With reference to FIG. 12, in case of VS=1, VO1 is performed to read out a sentence starting address selected by the Tvp pointer in the T register so that a sentence is spoken out according to the voice synthesization from the beginning to the end. At this time, the T register has in the leading two bytes a verbal information starting address of a sentence.

In case of VS=4, a flag WS is set so that, in VO2, the voice synthesization prior to the first parentheses is enabled depending on a sentence starting address selected from the pointer Vsp in the T register.

Addresses of verbal information for part of the sentence after the parentheses are placed in a side-track memory for sheltering purposes. When this sentence end in the parentheses, an end flag END is set. Each of the flags WS and END is part of the data RAM 21. The flag WS is set in case where two sets of parentheses have a word therein changed therein. Step m11 is selected so that the verbal information from the back of the first parentheses to the front of the second parentheses is developed.

A sentence is spoken out according to the voice synthesization as follows:

A sentence: "DOES (THIS BUS) STOP AT (HILTON)?"

The first parentheses have two words which can be spoken out according to the voice synthesization while the second parentheses have a word which can not be spoken out. Under the assumption, the T register has the following information in its four locations (1) through (4):

(1): a verbal information starting address for the sentence (2): a verbal information starting address of the word "THIS"

(3): a verbal information starting address of the word "BUS"

(4): a code "FF, FF" by which the word "HILTON" is pronunciated in a spelled form of naming the letters of this word in order The pointer Tsp stores information for showing the beginning of information for the word in the second parentheses. The pointer Tep stores information for indicating termination of the information for the word in the second parentheses.

A routine DV1 in a step m6 is performed in which a pointer $D_{vp}$ of the D register is advanced to have a leading letter of the first word in the first parentheses. A step m7 is executed to operate a routine SUB in which any word for which voice synthesization is enabled is done and any word not to be spoken with voice synthesization is pronounced in a spelled form.

FIG. 13 shows a flow chart of this routine SUB. In FIG. 13, (T) indicates contents of the T register selected by the pointer Tvp. (D) indicates contents of the D register selected by the pointer Dvp. A indicates an accumulator and V indicates a register.

Since the location (2) of the T register contains a verbal information starting address for the word "THIS", steps $n_1 \rightarrow n_2$ are selected in order to detect the code FF for indicating that letters of a word are pronunciated in a spelled form according to the voice synthesization. A routine VO4 is executed in which the word "THIS" is generated according to the voice synthesization depending on a verbal information starting address of this word selected by the pointer Tvp of the T register. The routine SUB is terminated after (D), the contents of the D register are a letter "B" of the word "BUS" just after a space by advancing the position of the pointer Dvp. Step $n_4$, "A=u,)" is used to judge whether the accumulator A contains a code for representing a space or "( )".

After completion of the routine SUB, a step in FIG. 12 is selected to be steps $m_7 \rightarrow m_8$. The routine SUB is represented, as referred to step $m_8 \rightarrow m_9 \rightarrow Ⓐ \rightarrow m_7$, because the flag WS is kept set on account of the two parentheses having words changed and Tvp=Tsp is determined to fail. Tvp=Tsp means that the position of the T register to be read out corresponds to a pointer for indicating the beginning of information for a word within the second parenthese. After the voice synthesization, the pointer Tvp is incremented automatically by two bytes.

The further operation of the routine SUB of FIG. 13 is now described. Since the contents (T) of the T register selected by the pointer Tvp are a verbal information starting address of the word "BUS", steps $n_1 \rightarrow n_2$ are selected as described above. The routine VO4 is performed to provide the voice synthesization of the word "BUS".

The routine SUB is determined after the contents (D) of the D register are a leading letter "S" of the word "STOP" just after the closing one of the parentheses by advancing the parentheses by advancing the position of the pointer Dvp.

At this time, the equation Tvp=Tsp is held to select steps $m_7 \rightarrow m_8 \rightarrow m_9 \rightarrow m_{10} \rightarrow m_{11}$ so as to reset the flag WS. The routine VO5 is executed so that the voice synthesization is enabled from the back of the first parentheses to the front of the second parentheses in which case the addresses of part of sentence just after the second parentheses are placed in a side-track memory for sheltering purposes. It is detected whether the sentence has ended in the second parentheses. If so, the END flag is set.

The routine DV2 is selected so that the pointer Dvp is advanced to indicate a leading letter of the word within the second parentheses. The routine SUB is reexecuted as referred to steps $m_{11} \rightarrow$ Ⓑ $\rightarrow m_{12} \rightarrow m_7$.

As described above, the code "FF, FF" indicates that the prounciation of "HILTON" is enabled in a spelled from. In the routine SUB of FIG. 13, steps $n_1 \rightarrow n_7 \rightarrow n_8 \rightarrow n_9$ are selected. The step $n_1$ is executed to detect whether the high-order one byte of the contents (T) of the T register selected by the pointer Tvp is this code "FF". The step $n_7$ is executed to improve the contents of the pointer Tvp by one byte. The step $n_8$ is executed to detect the low-order one byte to be "FF" or not. The step $n_9$ is executed to improve the pointer Tvp by one byte.

A routine VO3 is in the step $n_{13}$ is performed so that the verbal information starting address for the word is used to provide the voice synthesization. Step $n_{12}$ is selected so that each of the verbal information starting addresses of the letters of the word "HILTON" within the second parentheses is addressed from the table of FIG. 10(C) and entered into the V register. Hence, steps $n_{10} \rightarrow n_{11} \rightarrow n_{12} \rightarrow n_{13} \rightarrow n_{14} \rightarrow n_{10}$ are represented so that the word "HILTON" is spoken out in its spelled form letter by letter.

In this case, the equation Tvp=Tep is satisfied and the END flag is set to enable steps $m_8 \rightarrow m_{13} \rightarrow m_{14}$. A succession of voice synthesization is therefore terminated.

If any sentence follows after the second parentheses, step $m_{15}$ of the flow chart of FIG. 12 is enabled to enable the sentence to be spoken out from the back of the second parentheses to the end of the sentence. Thereafter, the voice synthesization is terminated.

In case of VS=3, step $m_{16}$ is selected to operate a routine VO7 in which voice synthesization prior to the front of the second parentheses is enabled with the sentence verbal information starting address in the T register selected by the pointer Tvp. The addresses of part of sentence after the back of the second parentheses are memorized. When the sentence ends in the back of the second parentheses, the END flag is set.

The following steps in VS=3 are identical with part the case of VS=4. The case of VS=2 is identical with that of the case of VS=4 except that the flag WS is not set.

In case of VS=5 or 6, no information about any sentence is set in the location (1) of the T register so that the routine SUB is executed repeatedly until Tvp=Tep is given.

In case of VS=7, steps $m_{20} \rightarrow m_{21} \rightarrow m_{22}$ are selected until the contents (D) are a code of a space of Dvp=63 is given. In a routine of DV3, a verbal information starting address corresponding to any letter code stored as the contents (D) is extracted from the table of FIG. 10(D) and entered into the V register. The routine VO3 is effected to enable the voice synthesization of the letter. The D register has 64 memory locations so that step $m_{23}$ is selected to determine whether the pointer Dvp stores 63. The pointer Dvp starts from 0.

As described above, any word accompanied by no verbal information word by word is spoken out in a spelled from or letter by letter. Or, otherwise, such a word can be identified by generation of a predetermined simplified sound without any change of pitch or length of a note. In such a case, until the pointer of the D register is advanced by a full scale of one word by detecting that the T register stores the code of "FF, FF", the predetermined simplified sound is generated.

A symbol 51 in FIG. 1 is illuminated or not, dependent on whether any verbal information is present or absent. When it is not illuminated due to the absence of verbal information, the prounciation key 50 is actuated so that the contents of the D register are pronounced a spelled from or letter by letter.

When the contents (T) of the T register are set to be "FF,FF", steps $n_8 \rightarrow n_{15} \rightarrow n_{16} \rightarrow n_3$ are selected in the flow chart of FIG. 13 not to provide any voice synthesization.

This is in case of any symbol except for the alphabetical letters so that it is unnecessary to provide the voice synthesization.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic translator for translation of a desired sentence in a first language to a translated desired sentence in a second language different from the first comprising:
   storage means for containing exemplary sentences in said first language and their associated translated exemplary sentences in a second language therein as well as stored words in said first language and their associated translation words;
   means for selecting an exemplary sentence stored in said storage means, said desired sentence different from said exemplary sentence by one or more different words;
   input means for introducing said different words from said desired sentence which correspond in location in said sentence to replacable words of said exemplary sentence;
   means for translating said desired sentence to generate a translated desired sentence including,
      means for addressing said storage means to recall said translated exemplary sentence,
      means for searching said storage means and comprising each of said different words to said stored words contained therein,
      means, monitoring said means for searching, for detecting a coincidence between one of said different words and one of said stored words and recalling its associated translation word from said memory means,
      means for replacing each word in said translated exemplary sentence corresponding in meaning to a said replacable word in said examplary sentence with a said translation word to form a translated desired sentence;
   voice memory means having synthetic speech representations of said translated desired sentence stored therein; and
   voice synthesizer means responsive to said translation means and said voice memory means for producing a synthetic human speed representation of said translated desired sentence.

2. The translator of claim 1, wherein said voice memory means stores verbal information of letters of said stored words to enable the voice synthesizer means to verbally spell out said stored words.

3. The translator of claim 1, wherein the voice memory means stores verbal information of the first word said stored words so that they may be audibly generated.

4. The translator of claim 1, further comprising an indicator responsive to said voice memory means and its contents for indicating whether verbal information of the said different words is stored.

5. The translator of claim 1, wherein the voice memory means is connected to an indicator memory for storing whether the verbal information of any word is stored in the voice memory means.

6. The translator of claim 5, wherein said indicator memory stores in one-bit information of whether the verbal information of any word is stored in the voice memory means.

* * * * *